United States Patent
Dotolo

(10) Patent No.: US 11,216,860 B2
(45) Date of Patent: *Jan. 4, 2022

(54) METHOD FOR SMART RATE PLANS

(71) Applicant: Aeris Communications, Inc., San Jose, CA (US)

(72) Inventor: Steve Dotolo, Tulsa, OK (US)

(73) Assignee: AERIS COMMUNICATIONS, INC., San Jose, CA (US)

(*) Notice: Subject to any disclaimer, the term of this patent is extended or adjusted under 35 U.S.C. 154(b) by 392 days.

This patent is subject to a terminal disclaimer.

(21) Appl. No.: 16/161,369

(22) Filed: Oct. 16, 2018

(65) Prior Publication Data

US 2019/0139119 A1    May 9, 2019

Related U.S. Application Data

(63) Continuation of application No. 13/722,827, filed on Dec. 20, 2012, now Pat. No. 10,109,002.

(51) Int. Cl.
*G06Q 30/06*  (2012.01)

(52) U.S. Cl.
CPC ............................. *G06Q 30/0631* (2013.01)

(58) Field of Classification Search
CPC .............................................. G06Q 30/06–08
USPC ............................................. 705/26.1–27.2
See application file for complete search history.

(56) References Cited

U.S. PATENT DOCUMENTS

| | | | |
|---|---|---|---|
| 6,574,465 B2 | 6/2003 | Marsh et al. | |
| 7,787,864 B2 | 8/2010 | Provo | |
| 10,109,002 B2 * | 10/2018 | Dotolo | G06Q 30/0631 |
| 2010/0169234 A1 * | 7/2010 | Metzger | H04W 4/24 705/348 |
| 2010/0192144 A1 * | 7/2010 | Schmit | G06F 8/61 717/173 |
| 2011/0106579 A1 | 5/2011 | Nair et al. | |

OTHER PUBLICATIONS

The International Search Report and the Written Opinion of the International Searching Authority, dated Apr. 10, 2014, for International Application No. PCT/US2013/076000.

* cited by examiner

*Primary Examiner* — Ming Shui
(74) *Attorney, Agent, or Firm* — Brundidge & Stanger, P.C.

(57) ABSTRACT

The present invention relates generally to a process for determining optimized communication rate plans for one or more communications devices across one or more communications networks. The present invention provides for determining an intelligent rate plan for a user having one or more devices operative on a communications network with one or more rate plans. The present invention, in one or more embodiments provides a user of communication devices with a cost-effective rate plan solution in relation to the user's use of their devices and available cost-savings programs available to the user.

23 Claims, 4 Drawing Sheets

100

METHOD FOR SMART RATE PLANS

CROSS-REFERENCE TO RELATED APPLICATION

This application is a Continuation of U.S. Ser. No. 13/722,827, filed Dec. 20, 2012; which is incorporated herein by reference in its entirety.

FIELD OF THE INVENTION

The present invention relates generally to a process for determining optimized communication rate plans for one or more communications devices across one or more communications networks.

BACKGROUND OF THE INVENTION

Communications devices are used throughout most of the world and are often designed and developed to operate with at least one, if not more than one, communications network. Each communications device is uniquely identified within a network and is often uniquely identified within the network, thereby enabling a communications source device to contact the receiving device through connection points across the network. Similarly, each communications device is tracked on a network for its use of bandwidth in operation on one or more networks.

These communications devices are often in the form cellular phones, smartphones, or other telephonic-based equipment but may also include devices such as tablets, pads, and displays which are capable of connecting with and using a communications network's resources for communicating. Still other devices may include one-way communicating equipment, such as medical emergency or alarm-based equipment that contacts a receiving device or system across a network. The use of the term communications device or "device" herein is not intended to be limited to examples set forth, but rather incorporates and includes any device capable of communicating on, with, and/or across a communications network, wired or wireless, and thereby uses network resources of bandwidth to upload, download, transmit, receive, or transceive data. Examples of devices may include: laptops with 3G or WIFI capability; smartphones with 3G, 4G or CDMA/GSM; alarm systems across a publicly switched telephone network (PSTN) line; texting equipment; a machine-to-machine (M2M) environment; and similar.

In many applications, a communications device may not be physically connected with a communications network and may be able to connect with multiple communications networks owned by different entities. Tracking the use of a particular device on various networks is an important activity as the use of a network's bandwidth is typically the primary source of monetization for operators of a network.

FIG. 1 depicts a basic M2M communication network 100 having typical sensor-type devices 120, 130 and 140. Cell phones at 145 and 155 are also provided. In FIG. 1, the M2M network 100 has a central communication gateway 110 in which communications from devices 120, 130, 140, and 145 are linked with a service provider network 150. The linkage may be wired or wireless, and is depicted as the security camera 120 and the water alarm sensor 130 are in wireless communication with the gateway 110. Similarly, the traffic camera sensor 140 is in wired communication with the gateway, though one will appreciate that there are many variations to the type and protocol of communication for FIG. 1. As one can appreciate, there may be many variations for a M2M communication network and devices thereon. Further, smartphones and varied other devices may also be part of the network and communicate via varied means.

From FIG. 1, data sensed and obtained by the devices is transmitted across the M2M network to the service provider network 150 where the data may be shared as raw data or converted to information, often though software applications. Notification equipment 160 wirelessly receives the data from the service provider network 150, as may the cell phone 155, and acts in accordance with the received data for the specific event. For instance where the notification equipment is an alert system to send a text to a building owner in the event of a water leak, and the water sensor has sent data indicating a water leak, the notification equipment will then trigger an event to notify the building owner. Similarly, from FIG. 1, where the user 170 receives a suite of rolling historical data as to traffic camera operation cycles, the user may then act accordingly based on the received cumulative information. The transmission and receipt of data across the network from varied devices can be tracked on a per device basis, a per grouping of device basis, and across the network. The usage of data by a device is often then billed to a device-owning consumer (or user) based on a consumption rate plan that provides for a certain amount of time and/or use of data by a device owned by the user.

Unfortunately, usage plans are often determined or selected based upon a user's expected use of the device across a network, which is often difficult to accurately track with ease. Typically a device owner estimates an intended use amount, in time and/or bandwidth, and then begins to use the device and may not develop a routine cadence to routinely check daily usage amounts or similar. As a result, often a user may receive a billing from a network operator for the prior period of time (monthly or quarterly) where the user's use of the device on the network has exceeded the intended use, resulting in overages and network use costs that exceed the anticipated amount.

Operator networks are known to provide a historical review of a user's use on a network and make recommendations for a preferred rate plan to use for the following month. Similarly, a user may switch plans, choosing one operator's rate plan over another's for perceived benefits of costs, rate allowances, overages, credits, etc. These efforts to undertake a rate plan change require either the operator or the user to overtly recognize that another rate plan may be available or that the user's actual use exceeded his intended use and a change is needed, based on historical information.

However, undertaking such an effort is contradistinctive to a network operator's monetization model and is also an activity that a user may not recognize is available, particular as the user has already committed to a rate plan, likely as a subscription with the purchase of a device, and is likely not current on available rate plan options or offerings.

The situation is compounded where a user is the owner of many devices, such as a smartphone, laptop, tablet and alarm system, all on the same operator network and under one rate plan based on a capped use amount. The situation is further compounded where a user is the owner of hundreds of devices, each possibly on a varied rate plan and differing network, and each being operated by one of a hundred different user types each having their own particular communication need (time, bandwidth, location, etc.). Such a situation may exist at an equipment leasing company or corporate entity, for instance.

It is therefore desirable to provide for determining a smart rate plan in relation to a user's profile and use characteristics which provides for a cost-effective rate plan for the user independent of the number of devices or rate plans the user may have.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for determining an intelligent rate plan for a user having one or more devices operative on a communications network with one or more rate plans. The method preferably identifies the one or more rates plans of the user; identifies a user profile of the user having one or more use characteristics; and compares them to one or more available rate plans for the user. The method then determines an optimal rate plan for the user from the available rate plans in relation to the step of comparing and provides the intelligent rate plan to the user.

Another embodiment of the present invention provides a business method for determining a preferred rate plan for a user of multiple communications devices which will result in the user have a more cost-effective rate plan for the use of the multiple devices.

A further embodiment of the present invention provides for a computer program product stored on a computer usable medium, comprising: computer readable program means for causing a computer to control an execution of an application to perform a method for determining a cost-effective rate plan for a user having one or more devices operative on a communications network with one or more rate plans. The program product identifies one or more rates plans of the user and a user profile. Thereafter the program product compares the one or more use characteristics and the one or more rate plans of the user to one or more available rate plans for the user, to determine an optimal rate plan for the user from the available rate plans in relation to the step of comparing. In a preferred embodiment, the optimal rate plan and comparative results are provided to a user via a web-based means so that the user can see the analysis, the selected rate plan and agree with the determination.

DETAILED DESCRIPTION OF PREFERRED EMBODIMENTS

The present invention relates generally to a process for determining optimized communication rate plans for one or more communications devices across one or more communications networks.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
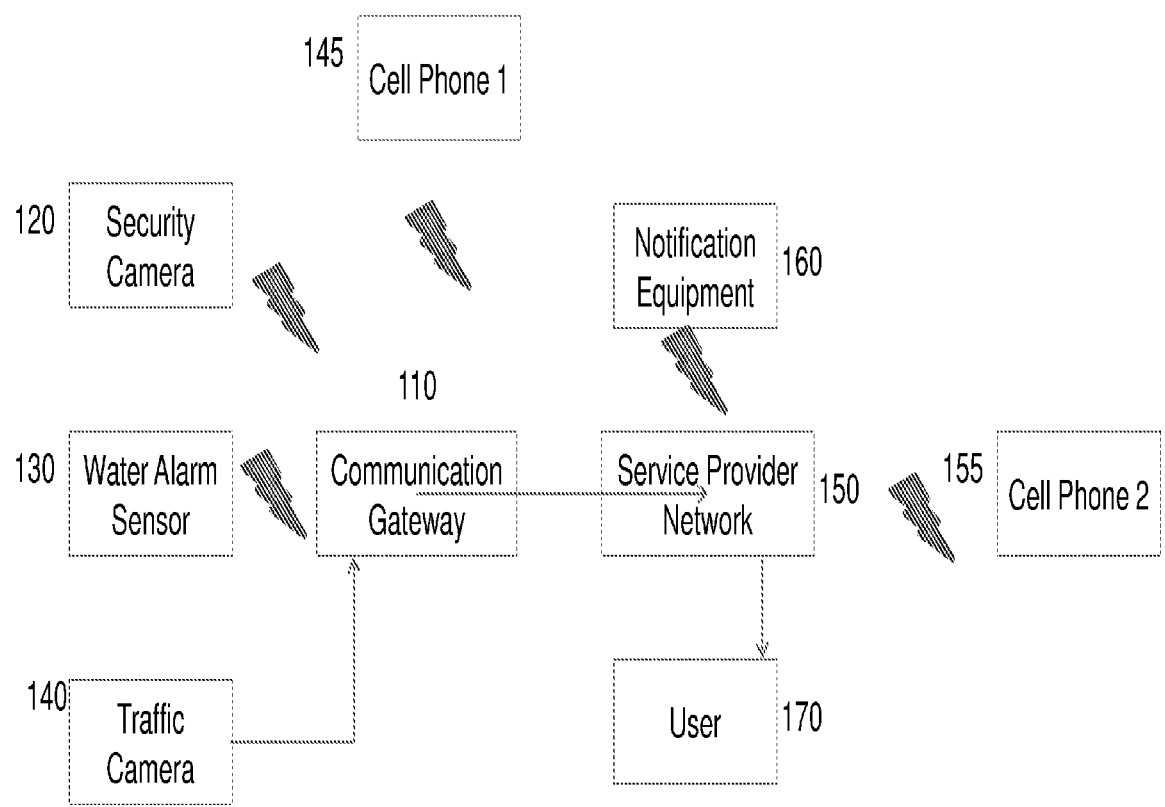
FIG. 1 depicts a basic M2M communication network having typical sensor-type devices.
Figure 2:
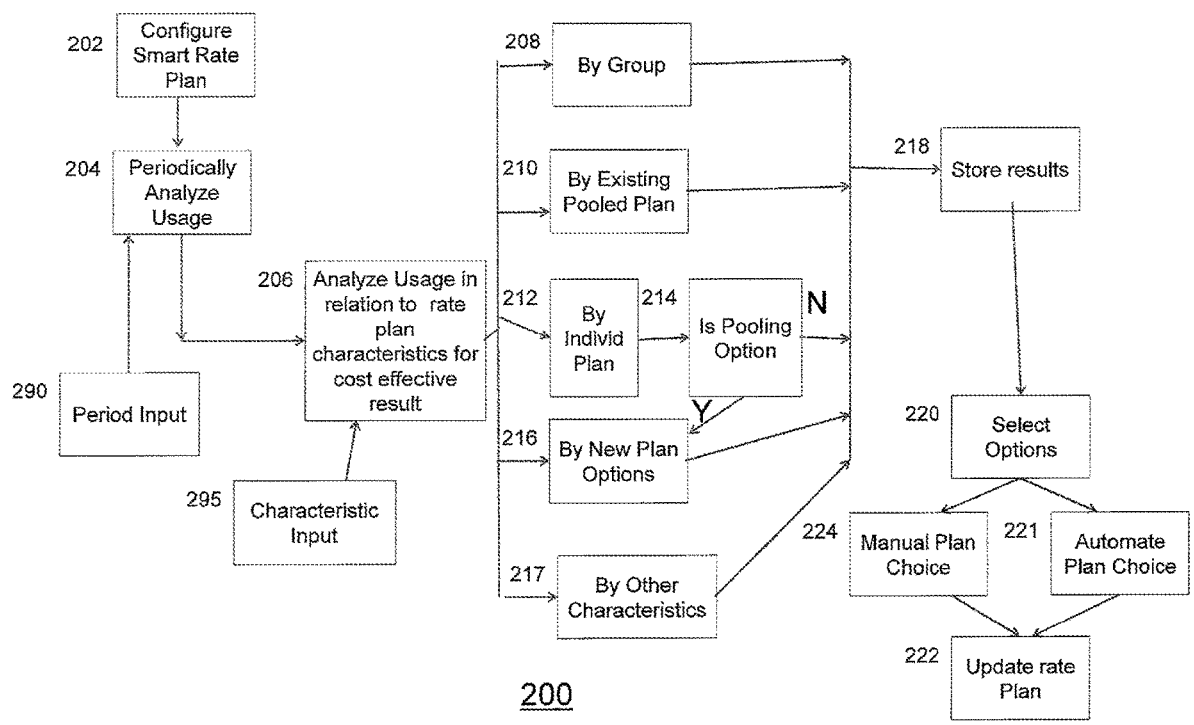
FIG. 2 sets forth a smart rate plan process in accordance with one or more embodiments of the present invention.

FIG. 2 sets forth a smart rate plan process 200 in accordance with one or more embodiments of the present invention. From FIG. 2, smart rate plans are configured, at 202. Inputs to the configured rate plans may include present rate plan offerings of the user, information from a user profile, anticipated offerings, location-based limitations, device-related constraints, etc. At 204, a user has been identified as has a user profile associated with that user, whereafter a usage analysis based upon a time period is determined. A predetermined period of time may typically include daily, weekly, monthly, quarterly, semi-annually, yearly, or similar.

At 206, preferably, in relation to one or more use characteristics and user rate plan characteristics, an analysis to determine an optimal rate plan is undertaken by assessing the existing rate plan, the user profile, one or more use characteristics, and available rate plans and options. A user profile may include one or more user characteristics such as individual devices, device groups, rate plans, usage pools, account overview, etc. A user rate plan characteristic may include but not be limited to a grouping, a pooling, and an individualized plan.

The analysis of 206 can be undertaken in one or more steps set forth as 208-217. At 208, an assessment is performed to analyze and determine an optimal plan when grouping is a primary determinant. Based on an analysis by group, a set of results is determined and preferably stored at 218. The results stored at 218, will be used as input to determine an optimal rate plan choice at 220.

At 210, an assessment is performed to analyze and determine an optimal plan when considering pooled plans is a primary determinant. Based on an analysis by pooled plans, a set of results is determined and preferably stored at 218. The results stored at 218, will be used as input to determine an optimal rate plan choice at 220. The comparison of available rate plans versus use characteristics is intended to yield a determination of a beneficial rate plan for a particular user in view of the compared one or more user characteristics.

At 212, an assessment is performed to analyze and determine an optimal plan when considering individualized plans is a primary determinant. Based on an analysis by individualized plans, a set of results is determined and preferably stored at 218. Optionally, a further consideration of whether the pooling is option 214 is evaluated, where if it is, new plans may also be considered at 216. The results stored at 218, will be used as input to determine an optimal rate plan choice at 220.

At 216, an assessment is performed to analyze and determine an optimal plan when considering new plans is a primary determinant. Based on an analysis by new plans, a set of results is determined and preferably stored at 218. The results stored at 218, will be used as input to determine an optimal rate plan choice at 220.

At 217, an assessment is performed to analyze and determine an optimal plan when considering other factors is a primary determinant. Based on an analysis by other factors, a set of results is determined and preferably stored at 218. The results stored at 218, will be used as input to determine an optimal rate plan choice at 220. Other factors may include information and data that can be obtained from user account data, user profile, use characteristics, device information, network information, and similar.

At 220, based on the inputted data, an optimal rate plan can be determined which will fulfill the needed criteria of the user, such as but not limited to the most cost-effective rate plan. Once determined the optimal rate plan can be review by or with the user and updated to reflect the user's needs. The update may be manually performed at 224 or may be automatically performed at 221, based upon user criteria. The optimal plan then becomes the user's activated and current plan via updating at 222.

Use characteristics of a user plan may include, but not be limited to, use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan, etc.

In operation, the present invention, in determining a most cost-effective rate plan, after a user's use is compared with their rate plan and available rate plans, may determine, based on a comparison of one or more use characteristics, that the present plan is the most cost-effective and so no change is recommended. In another embodiment, based on one or more other use characteristics, it may be determined that a newly-available rate plan is a better solution for the user and the new plan is recommended to the user or dynamically updated as active to the user's account. In a further operation of the present invention, possible plans may be assessed by group, then pooled plans, then individual plans, and from this assessment an improved options can be provided to the user.

Figure 3:
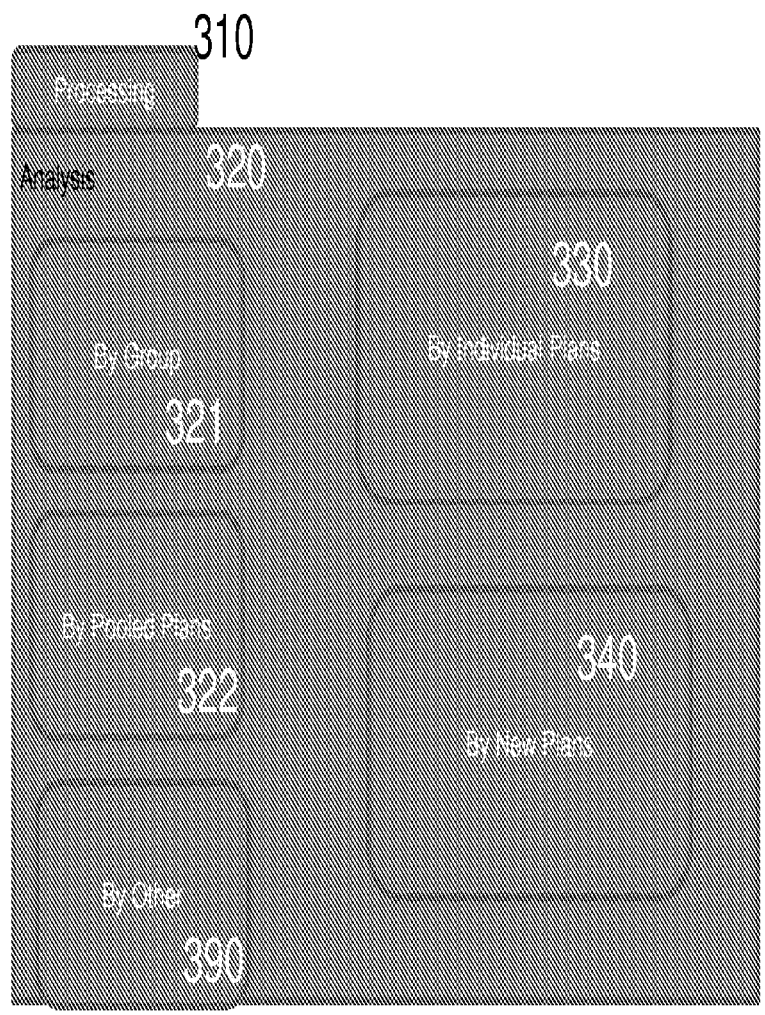
FIG. 3 sets forth a detail of the processing steps for the present invention in one or more preferred embodiments.

FIG. 3 sets forth a detail of the processing steps 300 for the present invention in one or more preferred embodiments. From FIG. 3, the processing 310 of the present invention performs an analysis 320 which analyzes an existing rate plan with possible other rate plans by comparing user profile information, use characteristics, and available rate plans with one or more rate plan characteristics. Rate plan characteristics may include one or more of a grouping 321, a pooling 322, and an individualized plan 330. Further, such may include a comparative assessment as in view of other available rate plans 340 and by other comparative criteria that may be available from information of the user's account, user's profile or use characteristics 340.

Figure 4:
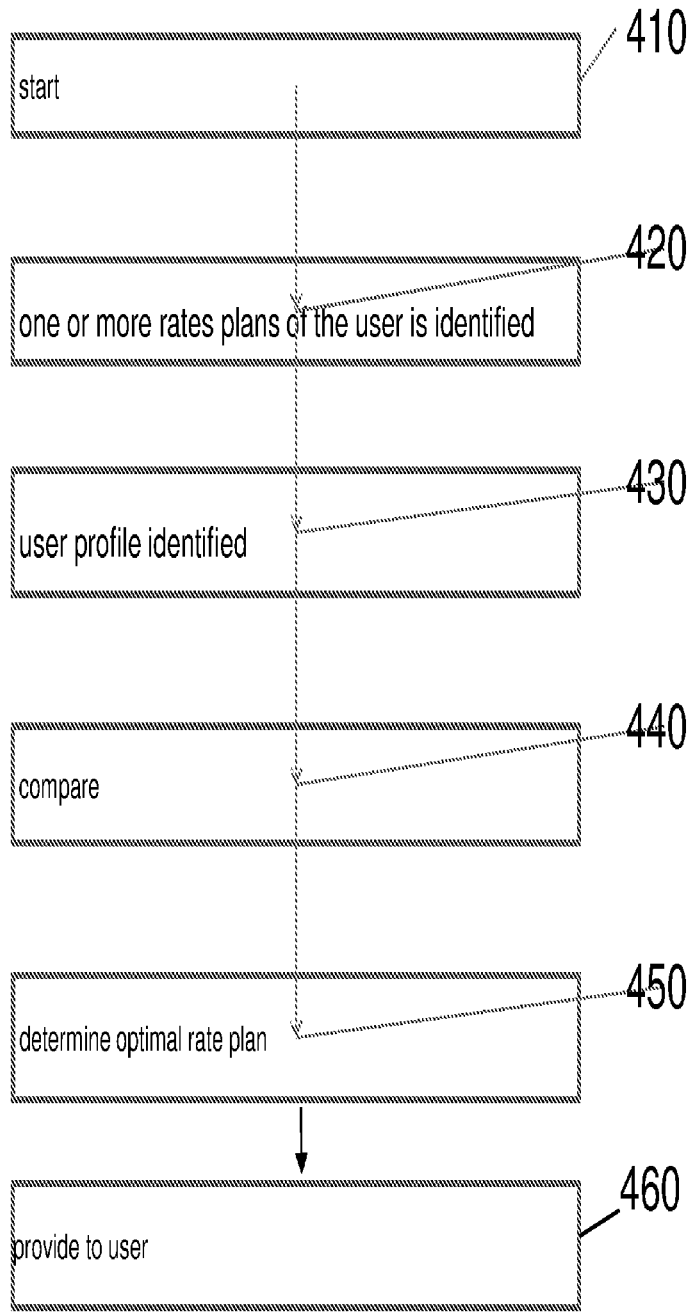
FIG. 4 sets forth a logic flow diagram for the present invention in accordance with one or more preferred embodiments

FIG. 4 sets forth a logic flow diagram 400 for the present invention in accordance with one or more preferred embodiments. From FIG. 4, the process of determining an intelligent rate plan for a user having one or more devices operative on a communications network with one or more rate plans is started at 410. At 420, one or more rate plans of the user are identified. At 430, a user profile of the user having one or more use characteristics is identified. At 440, the one or more use characteristics and the one or more rate plans of the user to one or more available rate plans for the user are compared. At 450, an optimal rate plan for the user from the available rate plans in relation to the step of comparing is determined. At 460, the determined optimal rate plan is provided to the user. In a preferred embodiment the determination of the optimal rate plan is provided to the user via a web-enabled means, such as through a website or email, in which the prior user rate plan and the preferred optimal rate plan are set forth along with calculations reflecting why the optimal choice was determined.

In operation, the present invention in accordance with one or more embodiments provides an improved rate plan choice for a user of one or more devices on a communications network. For example, in one embodiment, use data of a user is identified and has one or more user profile characteristics including the data used by the user over an annual period of time. The present invention assesses the annual use data and determines that the average data use per device owned by the user in months 3, 4, 5 and 6 is 10 MB, across the collective account. The present invention, following assessment, also determines that the average data use per device owned by the user in months 1, 2, and 7-12 is 1 MB, across the collective account. The present invention may then recommend a forward rate plan strategy to be one of modifying the user's rate plan each month to plan for a higher use or a lower use for a respective month to reduce cost, providing an annual rate plan with a rate use plan cap reducing cost, and automatically updating the user's plan each month to provide the optimum cost efficiency.

In a further operation, the present invention in accordance with one or more embodiments, automatically provides improved multiple rate plans for a user of one or more devices on a communications network. For example, in one embodiment, use data of a user is evaluated in relation to the use data of other individual devices or groups of devices that participate in rate plan pooling. The present invention rates traffic of each of the participating plans on a predetermined periodic basis, for instance such as a daily basis. In so doing, the present invention enables a customer to view bill-to-date cost information as it relates to each possible rate plan, where data can be displayed to the user in a variety of ways including by device level, pool level, account, rate plan, etc. In a preferred embodiment, the present invention also may rate the plans for the user and automatically select the least cost plan for the user, optionally for a fee.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks

What is claimed is:

1. A method for selecting an optimal rate plan for a user having one or more devices operative on a communications network from one or more rate plans, comprising:
   identifying at least one of the one or more rate plans available for the user;
   tracking communications network usage of each device of the one or more devices via central communication gateway to identify one or more usage characteristics of each device;
   identifying a user profile of the user having one or more usage characteristics;
   comparing the one or more usage characteristics with each of the one or more rate plans available over a predetermined time period;
   determining an optimal rate plan for the user based on at least one characteristics of the one or more rate plans; and
   dynamically implementing the optimal rate plan as activated and current plan for the user by an automatic update.

2. The method of claim 1, wherein the one or more usage characteristics includes one or more of use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan.

3. The method of claim 2, wherein the step of comparing further includes analyzing the one or more rate plans of the user by at least one rate plan characteristic.

4. The method of claim 3, wherein the rate plan characteristic is one or more of a grouping, a pooling, and an individualized plan.

5. The method of claim 4, wherein the user profile includes user information indicating one or more of individual devices, device groups, rate plans, usage pools, account information and account overview.

6. The method of claim 5, wherein the optimal rate plan is determined to be one of the available rate plans in relation to the usage characteristics as the optimal rate plan provides a lower cost over a predetermined period of time.

7. The method of claim 1, wherein the predetermined time period is one of a day, week, month, quarter, semi-annual, or annual period.

8. A system for selecting an optimal rate plan for a user having one or more devices operative on a communications network with one or more rate plans, comprising one or more devices, a communications network and a central communication gateway, wherein the system:
   identifies at least one of the one or more rates plans of the user;
   tracks communications network usage of each device of the one or more devices via the central communication gateway to identify one or more usage characteristics of each device;
   identifies a user profile of the user having one or more usage characteristics in relation to the plurality of communication devices;
   compares the one or more usage characteristics with each of the one or more rate plans available over a predetermined time;
   determines an optimal rate plan for the user based on at least one characteristics of the one or more rate plans; and
   dynamically implements the optimal rate plan as activated and current plan for the user by an automatic update.

9. The system of claim 8, wherein the one or more usage characteristics includes one or more of use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan.

10. The system of claim 9, wherein the step of comparing further includes analyzing the one or more rate plans of the user by at least one rate plan characteristic.

11. The system of claim 10, wherein the rate plan characteristic is one or more of a grouping, a pooling, and an individualized plan.

12. The system of claim 11, wherein the user profile includes user information indicating one or more of individual devices, device groups, rate plans, usage pools, account information and account overview.

13. The system of claim 12, wherein the predetermined time period is one of a day, week, month, quarter, semi-annual, or annual period.

14. The system of claim 5, wherein the optimal rate plan is determined to be one of the available rate plans in relation to the usage characteristics as the optimal rate plan provides a lower cost over a predetermined period of time.

15. The system of claim 8, wherein the predetermined time period is one of a day, week, month, quarter, semi-annual, or annual period.

16. A computer program product stored on a computer usable medium, comprising: computer readable program means for causing a computer to control an execution of an application to perform a method for selecting an optimal rate plan for a user having one or more devices operative on a communications network from one or more rate plans, comprising:
   identifying at least one of the one or more rate plans available for the user;
   tracking communications network usage of each device of the one or more devices via central communication gateway to identify one or more usage characteristics of each device;
   identifying a user profile of the user having one or more usage characteristics;
   comparing the one or more usage characteristics with each of the one or more rate plans available over a predetermined time period;
   determining an optimal rate plan for the user based on at least one characteristics of the plurality of rate plans; and
   dynamically implementing the optimal rate plan as activated and current plan for the user by an automatic update.

17. The program product of claim 16, wherein the step of the one or more usage characteristics includes one or more of use of bandwidth, use of data, frequency of calls, length of calls, amount of data used, data uploads, data downloads, data transmissions, voice transmissions, types of data used, amount of data traffic, incoming data traffic, outgoing data traffic, type of data plan, history of data usage, and history of cost of data plan.

18. The program product of claim 17, wherein the step of comparing further includes analyzing the one or more rate plans of the user by at least one rate plan characteristic.

19. The program product of claim 18, wherein the rate plan characteristic is one or more of a grouping, a pooling, and an individualized plan.

20. The program product of claim 19, wherein the user profile includes user information indicating one or more of individual devices, device groups, rate plans, usage pools, account information and account overview.

21. The program product of claim 20, wherein the optimal rate plan is determined to be one of the available rate plans in relation to the usage characteristics as the optimal rate plan provides a lower cost over a predetermined period.

22. The program product of claim 21, further comprising generating a web-based result of the rate plan comparison for a user.

23. The program product of claim 16, wherein the predetermined time period is one of a day, week, month, quarter, semi-annual, or annual period.

\* \* \* \* \*